US008681975B2

(12) United States Patent
Farrugia et al.

(10) Patent No.: US 8,681,975 B2
(45) Date of Patent: Mar. 25, 2014

(54) ENCRYPTION METHOD AND APPARATUS USING COMPOSITION OF CIPHERS (75) Inventors: Augustin J. Farrugia, Cupertino, CA (US); Nicholas Sullivan, Sunnyvale, CA (US); Gianpaolo Fasoli, Palo Alto, CA (US); Mathieu Ciet, Paris (FR)

(73) Assignee: Apple Inc., Cupertino, CA (US)

( * ) Notice: Subject to any disclaimer, the term of this patent is extended or adjusted under 35 U.S.C. 154(b) by 722 days.

(21) Appl. No.: 12/551,360

(22) Filed: Aug. 31, 2009

(65) Prior Publication Data
US 2011/0051931 A1    Mar. 3, 2011

(51) Int. Cl.
*H04L 9/28* (2006.01)

(52) U.S. Cl.
USPC .......................................... 380/42; 380/255

(58) Field of Classification Search
USPC .................... 380/255, 42; 280/255
See application file for complete search history.

(56) References Cited

U.S. PATENT DOCUMENTS

| 7,181,017 | B1* | 2/2007 | Nagel et al. | 380/282 |
| 2002/0026345 | A1* | 2/2002 | Juels | 705/10 |
| 2004/0032950 | A1* | 2/2004 | Graunke | 380/42 |
| 2004/0225570 | A1* | 11/2004 | Algesheimer et al. | 705/26 |
| 2005/0021539 | A1 | 1/2005 | Short et al. | |
| 2006/0291655 | A1* | 12/2006 | Ogram | 380/255 |
| 2008/0059787 | A1* | 3/2008 | Hohenberger et al. | 713/153 |
| 2008/0112559 | A1 | 5/2008 | Dyne | |
| 2009/0007240 | A1 | 1/2009 | Vantalon et al. | |
| 2010/0183150 | A1* | 7/2010 | Lee et al. | 380/255 |
| 2011/0154016 | A1* | 6/2011 | Niccolini et al. | 713/150 |

OTHER PUBLICATIONS

P. Paillier, "Public-Key Cryptosystems Based on Composite Degree Residuosity Classes," in Advances in Cryptology, EUROCRYPT 99. 1999, vol. 1592, pp. 233-238, Springer-Verlag, Lecture Notes in Computer Science.*
Pascal Paillier, Trapdooring Discrete Logarithms on Elliptic Curves over Rings, Advances in Cryptology, ASIACRYPT, pp. 573-584 (Dec. 3-7, 2000).*
Ivan Damgård, Mads Jurik, A Generalisation, a Simplification and Some Applications of Paillier's Probabilistic Public-Key System, Public Key Cryptography, pp. 119-136 (2001).*
Ran Canetti , Susan Hohenberger, Chosen-ciphertext secure proxy re-encryption, Proceedings of the 14th ACM conference on Computer and communications security, pp. 185-194 (ACM Oct. 28-31, 2007).*
Ahmed Reda Kaced and Jean-Claude Moissinac, "Secure intermediary caching in mobile wireless networks using asymmetric cipher sequences based encryption", Proceedings of the 3rd international conference on Mobile ad-hoc and sensor networks MSN'07, pp. 725-736 (Springer-Verlag 2007).*
International Search Report mailed Nov. 18, 2010, for PCT Patent Application No. PCT/US10/47388, filed Aug. 31, 2010, 3 pages.
Written Opinion mailed Nov. 18, 2010, for PCT Patent Application No. PCT/US10/47388, filed Aug. 31, 2010, 4 pages.

(Continued)

*Primary Examiner* — Jung Kim
*Assistant Examiner* — Theodore Parsons
(74) *Attorney, Agent, or Firm* — Adeli LLP (57) ABSTRACT

A method and associated apparatus for use in a data distribution process to allow an untrusted intermediary to re-encrypt data for transmission from an originator to a message receiver without revealing the data (message) or the cipher to the intermediary. This method uses a composition of two ciphers for re-encrypting the message at the intermediary, without revealing the plain text message or either cipher to the intermediary.

17 Claims, 3 Drawing Sheets

(56) References Cited

OTHER PUBLICATIONS

W. Aiello, et al., "Security Amplification by Composition: The case of Doubly-Iterated, Ideal Ciphers," Jun. 1998, pp. 1-21, Cryptology—Crypto 98 Proceedings, Lecture Notes in Computer Science vol. 1462, H. Krawczyk ed., Springer-Verlag, 1998.

* cited by examiner

ENCRYPTION METHOD AND APPARATUS USING COMPOSITION OF CIPHERS

FIELD OF THE INVENTION

This invention relates to computers, computer data security, cryptography, and ciphers.

BACKGROUND

Protection of digital content transferred between computers over a network is important for many organizations. Organizations attempt to secure this protection by implementing some form of digital rights management (DRM) process. The DRM process often involves encrypting the piece of content (e.g., encrypting the binary form of the content) in order to restrict usage to those who have been granted a right to the content. Content in this situation involves alphanumeric material, auto material such as music, and video material. It also involves of course combinations thereof, including text material.

A typical application is in the distribution of video and audio content where the sender is typically a central server and the ultimate recipient is a player, such as a digital audio and/or video player. Many such players however do not themselves have Internet or other network access, but instead connect to a computer which is also under control of the receiving party. The computer typically controls the distribution of content from the sender or server and downloads the received material to the player which is the actual recipient in terms of equipment. In this case the computer may be regarded as an untrusted or untrustworthy intermediary. That is, for unauthorized access a hacker may try to obtain access through the intermediary. In a typical situation the intermediary is further a weak point in terms of data security since many times the riskier operations in terms of, for instance, cryptography key handling take place at the intermediary (computer) rather than at the player. Hence there is a significant issue with so-called untrusted intermediaries.

Typically of course the distributed content is encrypted and the encryption involves use of keys. Protecting of transmission of these keys is very important. One way for hackers to obtain access to the keys is through the intermediary. Hence the keys themselves are typically distributed in some sort of encrypted form and thereby have some sort of encryption scheme applied to them.

Therefore the present inventors have determined that there is a need for improved security as regards message transmission where an untrusted intermediary is involved.

SUMMARY

This disclosure is of a method and associated apparatus for a data distribution scheme to allow an untrusted intermediary to re-encrypt data for distribution to a message receiver without revealing the data or any ciphers to observers of the intermediary. The present method is explained below in the context of a three party distribution system, there being a message originator, an intermediary which is considered relatively insecure, and a message receiver or recipient. In one case the message originator is a central server under control of an enterprise or organization which distributes content, however this is not limiting. The intermediary is typically a computer or computing device connected to the central server by a network such as via the Internet but this is not limiting. The message receiver is typically a video or audio player or equivalent which plays the content and receives the content (or at least the DRM information needed to play content) from the intermediary. The intermediary thus executes certain client software which interacts with the (host) server software and may be insecure because it performs e.g. key management functions. However the present situation is not limited to the intermediary being a separate apparatus from the receiver, but in fact the intermediary, as explained below, may be part of the originator or part of the receiver. Further there may be multiple intermediaries in a chained process as explained below.

In this context each of these entities, the message originator, intermediary and message receiver, are some sort of computing device, although the message receiver itself may not have Internet or other network access.

The present method involves first encrypting the original or "plain text" message (which is, for instance, a content cryptographic key or DRM information or other message and is typically a relatively short message, but this is not limiting) using a substitution cipher process. Substitution ciphers which are an example of such a process are well known, but not commonly used in current cryptography. Prior to development of computers, many so-called ciphers were what are currently referred to as "substitution ciphers". A substitution cipher generally is a method of encryption by which units of plain text are replaced with cipher text according to a regular predetermined system. The units may be single letters, pairs of letters, triplets of letters, numerals, etc. The receiver decrypts the text by performing an inverse substitution. Many such substitution ciphers are known and they typically involve some sort of lookup table or algorithm manipulation which performs the substitution. Note that the more complex forms of these may be machine ciphers typically using polyalphabetic substitution. The substitution cipher process also may be a transitive (mathematical) function or a homomorphic function.

In any case substitution ciphers are generally considered relatively insecure if it is possible for an attacker to know or guess the plain text (the unencrypted message). However in the context of so-called "random" plain text, which is the case for instance with transmitting short messages which themselves are cryptographic keys or other DRM data, breaking such substitution ciphers is quite difficult. Also of course when messages are short any sort of breaking of the encrypting process using such a guessed plain text approach is relatively difficult. Moreover the present method is not intended to provide extremely high levels of security, but to provide an additional layer of security against the typical hacker or other attacker who has limited resources and where the value of each piece of underlying content is relatively small.

The reference to substitution ciphers here is not limiting. More broadly, this refers to a substitution or translation type process (referred to here also as a "substitution cipher process") as distinguished from modern key based cryptographic processes. The degree of complexity of the translation process depends on the degree of security desired. Of course a substitution cipher process inherently requires the substitution cipher algorithm to be installed at the sender and the composed decrypting algorithm to be installed at the intermediary.

Substitution ciphers have one important property which is used here. They can be composed or merged with another cipher. In other words, instead of sequentially applying a first substitution cipher to a message and then applying a second cipher to the encrypted message, one can instead collapse this into one step by applying a single third substitution cipher to the plain text which results in the same encrypted text as does the sequential application of the two substitution ciphers.

This process (and its inverse similar decrypting process) is referred to here as "composition" or "composing".

Also, the present inventors have recognized that decrypting and re-encrypting an encrypted message based on a substitution cipher requires only a single step, because the decryption of the first cipher and re-encryption into the second cipher can be collapsed into one step. Hence reference here to a substitution cipher process is generally meant to refer to ciphers which are subject to such a composition process. This is generally not the case with most conventional computer-based modern ciphers, especially when message padding or expansion is used. In some embodiments here a substitution cipher is combined with another non-substitution cipher to achieve the same result.

Note that the general concept of composing two ciphers to make a third is known, see "Security Amplification by Composition: The Case of Doubly-Iterated, Ideal Ciphers" by W. Aiello et al., 1998. The resulting composition is a new cipher, with a larger key size but the same block size. Also of course it is well known generally to double encrypt messages using two different ciphers, even prior to introduction of computer based ciphers.

DETAILED DESCRIPTION

Figures 1A, 1B:
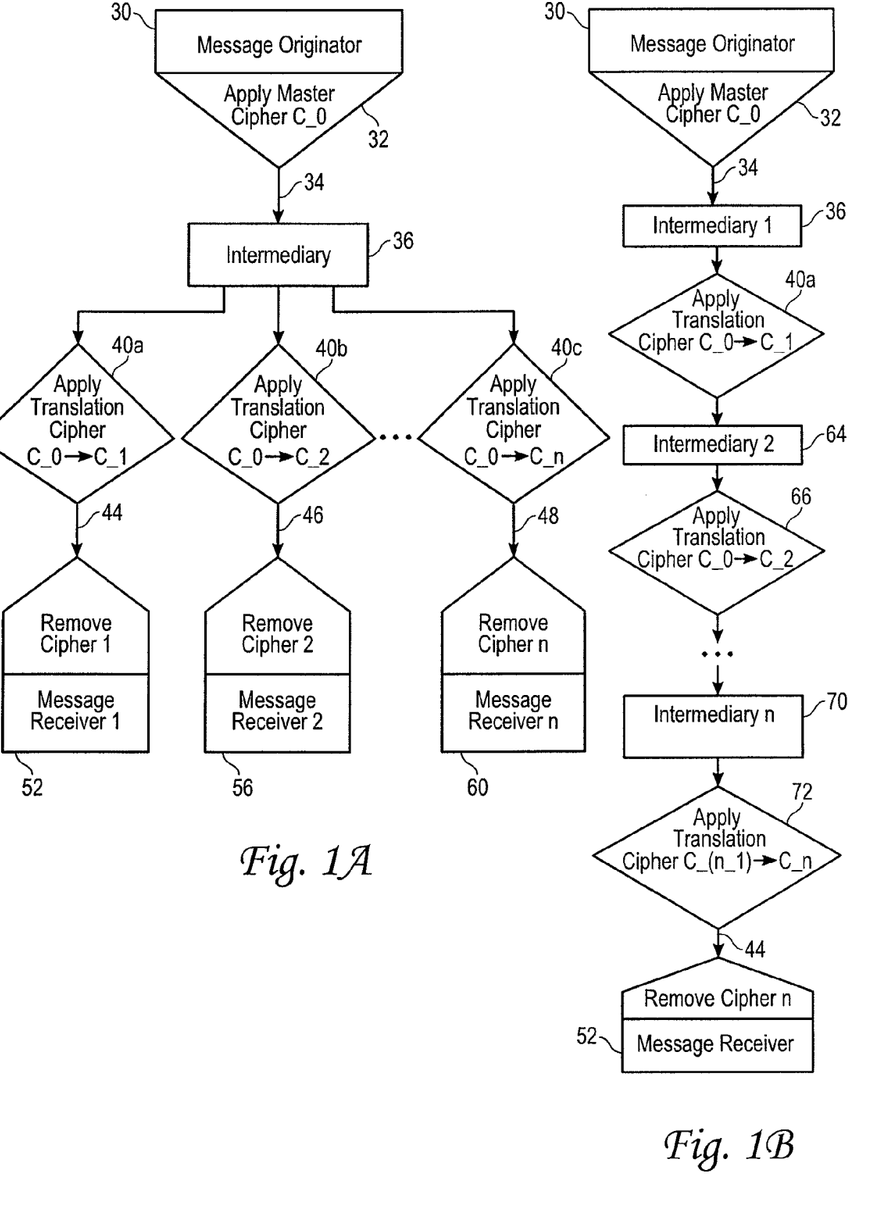
FIGS. 1A, 1B show graphically two processes in accordance with the invention.

A system and process in accordance with one embodiment of the invention is shown in present FIG. 1A in block diagram form. Each block represents a conventional apparatus in terms of a piece of hardware or a platform but not in terms of its functionality. The message originator 30 is typically a computer server or servers of well known type, which may host digital content and/or a DRM system associated with the content such as keys and identifiers, although of course the present method is not limited to short message or key distribution. This message originator 30 conventionally applies at step 32 a "master" cipher designated here $C\_0$ to the message to be sent which may be, for instance, a key or other DRM related information, but is not so limited. Details are described below.

This encrypted message is then distributed conventionally via a network or other communications link 34, typically the Internet, but not so limited, to the untrusted intermediary 36 which is considered relatively less secure than other parts of the system. Intermediary 36 is for instance a desktop computer or other computing device, including a mobile computing device and which for instance may perform some sort of key manipulation or management which renders it a relative weak point from the security standpoint. Intermediary 36 is further linked by communications links 44, 46 and 48 (in this example) to respective 1 to n message receivers 52, 56, ..., 60. For each message receiver 52, 56, ..., 60, the intermediary applies a different predetermined "translation" cipher at respective steps 40a, 40b, and 40c before communicating the message via respective communication links 44, 46 and 48 to the message receivers. The translation cipher (in effect) removes the master cipher and imposes a second cipher on the message. For instance, for message receiver 52, the intermediary at step 40a apples a translation cipher designated here $C\_0 \rightarrow C\_1$ that (in effect) removes cipher $C\_0$ and imposes the second cipher $C\_1$. Of course at no point is cipher $C\_0$ actually removed. Each message receiver then conventionally deciphers (removes) the respective second cipher $C\_1$ to recover the original message.

Message originator 30, intermediary 36 and message receivers 52, 56 and 60 in one embodiment are elements of well known systems for distributing digital content such as music and videos via the Internet of which several types of systems are now commercially available. The system is intended to execute a digital rights management (DRM) scheme of the type selected by for instance the enterprise controlling the message originator. Message originator 30 is typically a computer server and the intermediary 36 and each of message receivers some sort of computing devices although with different types of capabilities. A typical intermediary 36 is a desktop or portable computer which is linked to the message receivers which are for instance video/audio players which may themselves not have their own Internet connectivity. Links 44, 46 and 48 can be any sort of link such as a USB connection, Ethernet, wireless, IEEE 1394, infrared, etc. The purpose of the system is to download content from the message originator 30 or some associated server which actually holds the content to the message receivers 52, 56 and 60. Typically the intermediary 36 may execute client software interacting with the host software message originator 30. Hence the message receivers are typically for instance any device capable of utilizing the downloaded content, for instance a music player, video player, game console, camera, etc.

FIG. 1B shows a system and process having similarities to those of FIG. 1B with similar elements identically labeled. However in FIG. 1B instead of a single intermediary 36, there is a chain of intermediaries here including additional intermediaries 64 and 70, however as indicated there may be n intermediaries, where n is any suitable integer. In this case the second intermediary 64 applies its own translation cipher designated $C\_1 \rightarrow C\_2$ at step 66 and intermediary n 70 sequentially applies at step 72 its own translation cipher designated $C\_(n-1) \rightarrow C\_n$ at 72. Obviously in this case the message receiver must decipher the message (remove cipher n designated $C\_n$) by applying the inverse of that nth cipher applied by the last intermediary 72.

Note that in accordance with the invention, there is a significance performance gain since both the deciphering-re-enciphering in the intermediary and the ultimate decryption step taking place in each message receiver only require a single step, even though during transmission the message has been deciphered and re-enciphered.

Typically the enciphering and deciphering algorithms are implicit in a software implementation. Typically no actual keys to the substitution or second ciphers therefore are transmitted during the FIG. 1A or FIG. 1B processes since the enciphering and deciphering are predetermined and effectively the keys, if any are needed, are "built in" to each entity (e.g., hardwired into the relevant software or circuitry or pre-installed in memory). Note that substitution ciphers do not necessarily have a key per se transmitted with or associated with each message, but do require encoding and decoding algorithms. The second ciphers (those imposed by the intermediary or intermediaries) themselves may be public key/private key ciphers.

Moreover in other embodiments, the intermediary is not necessarily a separate hardware entity, but may be incorporated into the message originator or the receiver. In other words in accordance with the invention there is also use of a composed cipher process with a message being sent direct from the originator to the message receiver, but with the application of the translation cipher applied at the originator or at the receiver.

An advantageous feature here is to vary the encryption of the data based on the type of device to which it is being sent. When the same key is to be used on multiple devices, it is useful to have a mechanism for the intermediary to re-encrypt the key (which here is the actual message) for distribution to multiple devices without revealing the data or cipher used to any attackers. This technical problem is solved by the present approach. The following shows two detailed examples in accordance with the invention.

Example 1

In this example, see FIG. 1A, each of the entities (assumed to be some sort of computing device) is set up (that is initialized with appropriate software and data for instance) before communication can begin.

The initialization requires providing a set of substitution ciphers. This set of ciphers can be combined, since the composition of two substitution ciphers is a unique substitution cipher. First, one chooses a substitution cipher as the master cipher designated $C\_0$. For example take the following cipher expressed logically using set notation as:

$(a\_1, a\_2, \ldots, a\_32) \rightarrow (r\_0\_1(a\_1), r\_0\_2(a\_2), \ldots, r\_0\_32(a\_32))$ where the message is $a\_1, \ldots, a\_32$ which are each 8-bit values and $r\_i\_1, \ldots, r\_i\_32$ are each randomly chosen permutations on the set $\{0, 1, \ldots, 255\}$. The mapping function indicated by the symbol "→" logically designates the encryption process. This master cipher has an inverse (decryption process) designated $C\_0inv$.

For each intermediary that will be used, select another (substitution or other) cipher designated $C\_i$, where for example:

$(a\_1, a\_2, \ldots, a\_32) \rightarrow (r\_i\_1(a\_1), r\_i\_2(a\_2), \ldots, r\_i\_32(a\_32))$ where $a\_1, \ldots, a\_32$ are each 8-bit values and $r\_i\_1, \ldots, r\_i\_32$ are each randomly chosen permutations on the set $\{0, 1, \ldots, 255\}$. Each cipher $C\_i$ has an inverse (decrypting process) designated $C\_iinv$.

One then computes the composed (translation) designated cipher $C\_i(C\_0inv)$ which is the composition of the two ciphers $C\_0$ and $C\_i$, for each recipient i. When this new composed cipher is applied to the message encrypted by the master cipher, the translation cipher implicitly removes the master cipher ($C\_0$) and applies the second cipher $C\_i$.

Once each of the ciphers is set, the process to encipher with $C\_0$ is conventionally implemented on the server (sender), the process to encipher with composed cipher $(C\_i)C\_0inv$ is implemented on the intermediary for each recipient i, and the deciphering process $C\_iinv$ is implemented on recipient i.

In the first execution step on the server, one enciphers the message designated here M on the server using cipher master $C\_0$ and distributes the resulting enciphered message $C\_0(M)$ to the intermediary as in FIG. 1A.

In the second execution step, when requested by message receiver i, the intermediary re-enciphers the message $C\_0(M)$ using the translation (composed) cipher $C\_i(C\_0inv)$. This effectively removes the initial (master) cipher $C\_0$ and applies the second cipher $C\_i$ in one step. The resulting enciphered value expressed logically as $C\_i(C\_0inv(C\_0(M))=C\_i(M)$, is distributed to the recipient.

In the third step to retrieve the original message M at the recipient, the recipient applies the deciphering transformation $C\_iinv$ to the received message $C\_i(M)$. This removes the cipher $C\_i$ and provides the message receiver with the unenciphered (plain text) original message M.

This method provides the security needed to protect the data and the values used because the untrusted intermediary has access only to the composed cipher $C\_iinv(C\_0)$, which does not reveal any useful information about ciphers $C\_i$ or $C\_0$.

Example 2

The variation of the embodiment of FIG. 1B is to have several intermediaries coupled (such as via a communications network) in sequence. In this variation, each intermediary in the chain applies its own translation cipher that implicitly "removes" the previous "mask" while applying a new "mask". This involves four or more parties, the message sender, the plural intermediaries, and at least one recipient. In this scheme, each of the parties again needs to be initialized before communication can begin.

The initialization again requires providing a set of substitution ciphers. This set of ciphers can be combined, since the composition of two substitution ciphers is a unique substitution cipher.

First one chooses a substitution cipher as the master cipher designated $C\_0$, for example take the following master cipher:

$(a\_1, a\_2, \ldots, a\_32) \rightarrow (r\_0\_1(a\_1), r\_0\_2(a\_2), \ldots, r\_0\_32(a\_32))$ where $a\_1, \ldots, a\_32$ are each 8-bit values and $r\_i\_1, \ldots, r\_i\_32$ are each randomly chosen permutations on the set $\{0, 1, \ldots, 255\}$. This master cipher has an inverse $C\_0inv$.

For each intermediary in the chain, one selects another cipher designated $C\_i$, for example:

$(a\_1, a\_2, \ldots, a\_32) \rightarrow (r\_i\_1(a\_1), r\_i\_2(a\_2), \ldots, r\_i\_32(a\_32))$ where $a\_1, \ldots, a\_32$ are each 8-bit values and $r\_i\_1, \ldots, r\_i\_32$ are each randomly chosen permutations on the set $\{0, 1, \ldots, 255\}$. Each cipher $C\_i$ has an associated inverse (decryption) process designated $C\_iinv$.

One computes the composed cipher $(C\_i+1)(C\_iinv)$ which is the composition of the two ciphers, for each intermediary i. When this new cipher is applied, it implicitly removes the previous cipher $C\_i$ and applies the next cipher $C\_i+1$.

In the first step on the server (sender), one enciphers the message designated M at the server with cipher $C\_0$ and distributes the resulting encrypted message $C\_0(M)$ to the first intermediary.

In the second step, the first intermediary encrypts $C\_0(M)$ using the translation cipher $C\_1(C\_0inv)$ as in example 1, This removes the master cipher $C\_0$ and applies the second cipher $C\_1$ in one implicit step. The resulting value $C\_1(C\_0inv(C\_0(M))=C\_1(M)$, is distributed to the next intermediary.

In the third step, the second intermediary encrypts $C\_1(M)$ using the translation cipher $(C\_2)(C\_1inv)$. This removes the previous cipher $C\_1$ and applies the next cipher $C\_2$ in one implicit step. The resulting value $C\_2(C\_1inv(C\_1(M))=C\_2(M)$, is distributed to the next intermediary.

In the nth step (for intermediary n), the nth intermediary encrypts value $C\_(n-1)(M)$ with its translation cipher $C\_n(C\_(n-1)inv)$. This removes the previous cipher $C\_(n-1)$ and applies the next cipher $C\_n$ in one implicit step. The resulting value $C\_n(C\_(n-1)inv(C\_(n-1)(M))=C\_n(M)$, is distributed to the recipient (or to the next intermediary).

In the final step at the recipient to retrieve the original message M, one applies the transformation $C\_ninv$ to the received message C_n(M). This removes the cipher C_n and provides the message recipient with the plain text (original) message M.

Other variants of this method for both the FIG. 1A and FIG. 1B approaches include choosing another set of transitive functions for the ciphers for which the composition of two functions does not reveal the any information about the cryptographic functions or their inverses.

Figure 2:
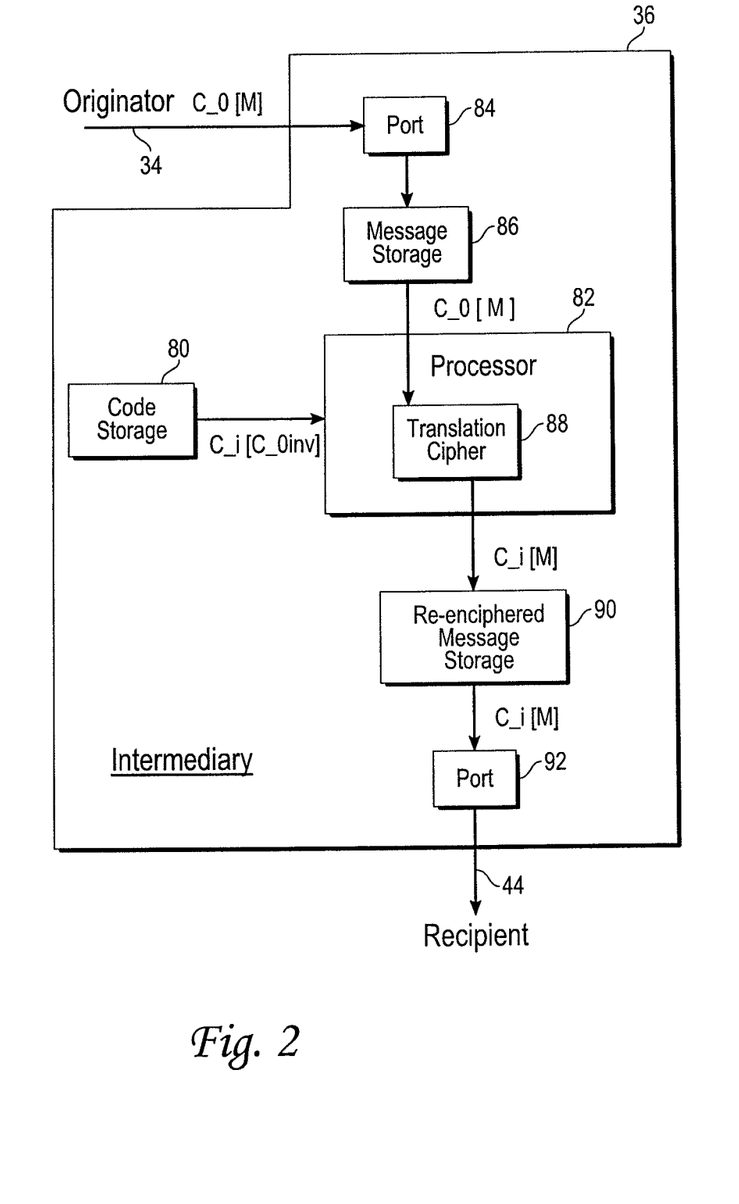
FIG. 2 shows relevant portions of a computing device for carrying out the present method.

FIG. 2 shows in a block diagram relevant portions of a computing device (system) in accordance with the invention and which functions as an intermediary 36. (Note that the message originator 30 and message recipient 52 are largely conventional.) Apparatus 36 is, e.g., a server platform, computer, mobile telephone, Smart Phone, personal digital assistant or similar device, or part of such a device and includes conventional hardware components executing in one embodiment software (computer code) as represented by the above pseudo-code examples. This code may be, e.g., in the C or C++ computer language or its functionality may be expressed in the form of firmware or hardware logic; writing such code or designing such logic would be routine in light of the above pseudo code. Of course the above pseudo code examples are not limiting.

The computer code is conventionally stored in code memory (computer readable storage medium) 80 (as object code or source code) associated with conventional processor for execution by processor 82. The incoming enciphered message (in digital form and carrying designation C_0[M] where M is the plain text (unenciphered) message) is received at port 84 and stored in computer readable storage medium (memory) 86 where it is coupled to processor 82. Software (code) modules in code memory 80 executed by processor 82 make up the translation cipher algorithm module 88 and which carry out the functionality set forth above in examples 1 or 2 or variants thereof. Here the relevant translation cipher is designated C_1[C_0inv]. Applying this to the enciphered message results in the re-enciphered message designated C_1[M].

Also coupled to processor 82 is storage 90 for the resulting re-encrypted message and port 92 for transmitting that re-encrypted message to the recipient or next intermediary. Storage locations 80, 86, 90 may be in one or several conventional physical memory devices (such as semiconductor RAM or its variants or a hard disk drive). Electric signals conventionally are carried between the various elements of FIG. 2.

Figure 3:
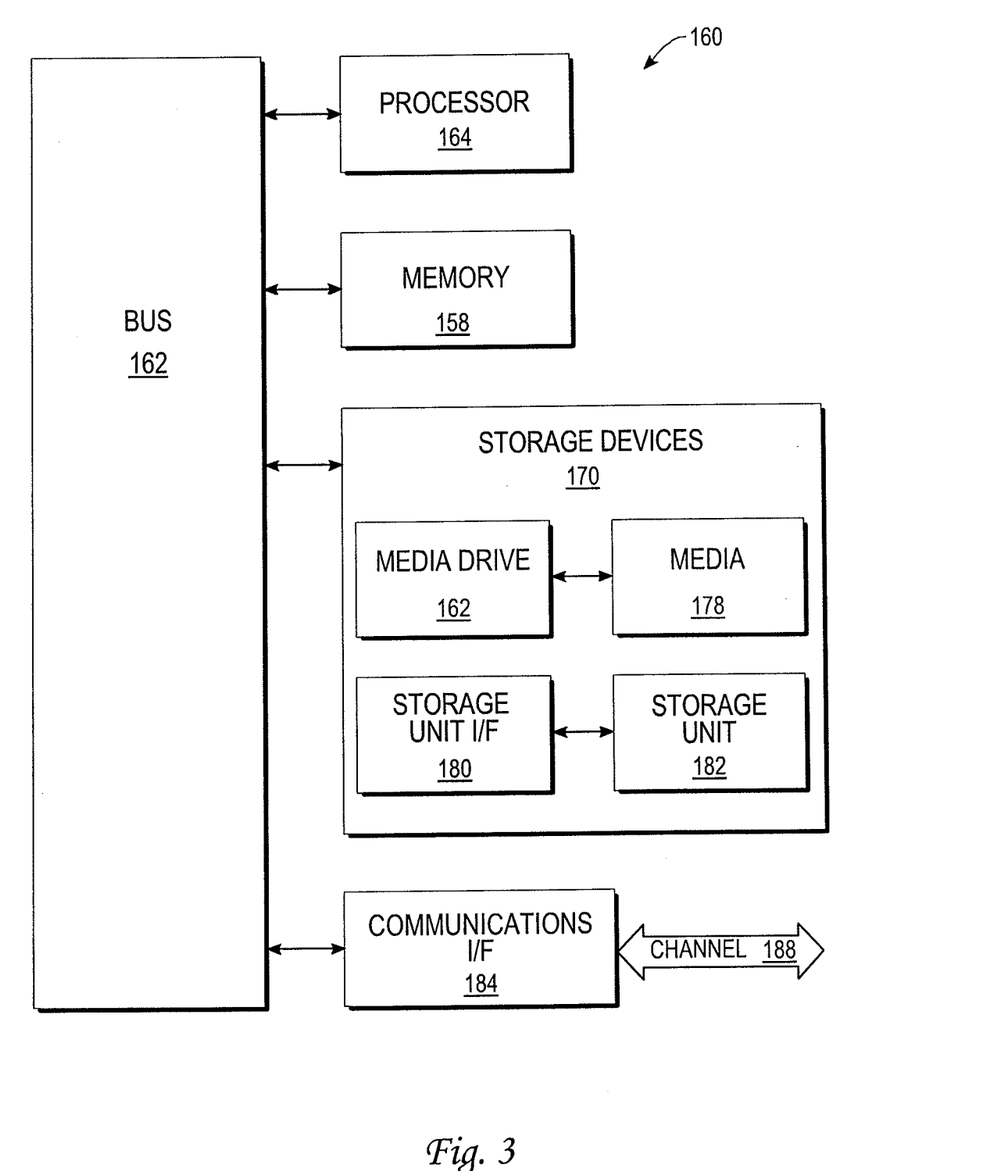
FIG. 3 shows additional detail of the FIG. 2 computing device.

FIG. 3 shows further detail of the FIG. 2 computing device in one embodiment. FIG. 3 illustrates a typical conventional computing system 160 that may be employed to implement processing functionality in embodiments of the invention and shows additional detail of the FIG. 2 system. Computing systems of this type may be used in the computer server (originator) or user (client) computer (the intermediary) or other computing device, for example including the recipient device. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164 (equivalent to processor 82 in FIG. 2). Processor 164 can be implemented using a general or special purpose processing engine such as, for example, a microprocessor, microcontroller or other control logic. In this example, processor 164 is connected to a bus 162 or other communications medium. Note that in some embodiments the present process is carried out in whole or in part by "hardware" (dedicated circuitry) which is equivalent to the above described software embodiments.

Computing system 160 can also include a main memory 158 (equivalent to memories 80, 86, 90 in FIG. 2), such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 162. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184 (equivalent to ports 84, 92 in FIG. 2). Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A method of distributing a message from a message originating computing device through at least two separate intermediary computing devices to a message receiving computing device, the computing devices coupled in a sequence, the method comprising:
   at each particular intermediary computing device in the sequence of computing devices:
     receiving the message ciphered with a previous substitution cipher applied to the message on a previous computing device in the sequence of computing devices, the received message comprising a plurality of units, each unit including at least two bits of information;
     re-ciphering the received message with a composition cipher that comprises a composition of an inverse of the previous substitution cipher and a substitution cipher, associated with the particular intermediary computing device, that replaces each of a plurality of the units of the received message with a ciphered unit according to a predetermined system that maps different possible values for message units to different cipher values for the message units, wherein the composition cipher is part of a sequence of composition ciphers that are each for use on a different intermediary computing device, and wherein the composition ciphers conceal their constituent substitution ciphers and the inverse ciphers; and
     transmitting the re-ciphered message to a next computing device in the sequence of computing devices over a data connection.

2. The method of claim 1, wherein, at each particular intermediary computing device, the composition cipher is such that its application to the received message results in the message being ciphered only in the substitution cipher associated with the particular intermediary computing device.

3. The method of claim 1, wherein the message is received at an input port of each particular intermediary computing device from a previous computing device in the sequence of computing devices.

4. The method of claim 1, wherein the composition cipher is at least one of a transitive function and a homomorphic function.

5. The method of claim 1 further comprising, at each particular intermediary computing device in the sequence of computing devices:
   storing the received message in a first storage; and
   storing the re-ciphered message in a second storage prior to transmitting the re-ciphered message to the next computing device in the sequence of computing devices.

6. The method of claim 1 further comprising, at each particular intermediary computing device in the sequence of computing devices:
   prior to receiving the ciphered message, receiving the composition cipher; and
   storing the composition cipher for later use in re-ciphering the ciphered message.

7. The method of claim 1, wherein the message comprises digital rights management data.

8. The method of claim 1, wherein an inverse of a last substitution cipher in the sequence of composition ciphers is for use in deciphering the message on the message receiving computing device.

9. The method of claim 1, wherein a first intermediary computing device in the sequence of computing devices receives the message ciphered with a substitution cipher applied by the message originating computing device.

10. A system for securely transmitting a message through a sequence of computing devices, the system comprising:
    a message originating computing device to (i) generate a message comprising a plurality of units, each unit including at least two bits of information, (ii) generate a sequence of substitution ciphers that each correspond to a different intermediary computing device, (iii) distribute each substitution cipher to its corresponding intermediary computing device, (iv) cipher the message with a first substitution cipher, and (v) transmit the ciphered message to a first intermediary computing device;
    a plurality of intermediary computing devices coupled in a sequence, each particular intermediary computing device to (i) receive the message ciphered with a previous substitution cipher from the sequence of substitution ciphers, the previous substitution cipher applied to the message by a previous computing device in the sequence of computing devices, (ii) re-cipher the received message with a particular composition cipher that comprises an inverse of the previous substitution cipher applied to the message and a different substitution cipher that replaces each of a plurality of the units of the received message with a ciphered unit according to a predetermined system that maps different possible values for message units to different cipher values for the message units, the particular composition cipher stored on the particular intermediary computing device, and (iii) transmit the re-ciphered message to a next computing device in the sequence of computing devices; and
    a message receiving computing device to (i) receive the ciphered message from a last intermediary computing device and (ii) decipher the message a final substitution cipher in the sequence of substitution ciphers.

11. The system of claim 10, wherein the message originating computing device is a central server and the message receiving computing device is a media player.

12. A non-transitory machine readable medium storing a program for distributing a message from a message originating computing device through a particular user controlled intermediary computing device to at least two separate recipient devices the program for execution by at least one processing unit on the user controlled intermediary computing device, the program comprising sets of instructions for:

receiving a message ciphered with a previous substitution cipher applied to the message by the message originating computing device, the received message comprising a plurality of units, each unit including at least two bits of information;

re-ciphering the received message with a composition cipher that comprises a composition of an inverse of the previous cipher and a substitution cipher, associated with the particular user controlled intermediary computing device, that replaces each of a plurality of the units of the received message with a ciphered unit according to a predetermined system that maps different possible values for message units to different cipher values for the message units, wherein the composition cipher is part of a sequence of composition ciphers that are each for use on the message originating computing device, the particular user controlled intermediary computing device, and the recipient devices; and transmitting the re-ciphered message to the recipient devices, wherein the intermediary computing device and the recipient devices are part of a group of devices that the user controls.

13. The non-transitory machine readable medium of claim 12, wherein the composition cipher is such that its application to the received message at the particular user controlled intermediary device results in the message being encrypted only in the substitution cipher associated with the particular user controlled intermediary computing device.

14. The non-transitory machine readable medium of claim 12, wherein the substitution cipher associated with the particular user controlled intermediary computing device includes at least one of a transitive function and a homomorphic function.

15. The non-transitory machine readable medium of claim 12, wherein the program further comprises sets of instructions for:

storing the received message in a first storage on the particular user controlled intermediary computing device; and storing the re-ciphered message in a second storage on the particular user controlled intermediary computing device.

16. The non-transitory machine readable medium of claim 12, wherein the program further comprises a set of instructions for storing the composition cipher in a storage on the particular user controlled intermediary computing device.

17. The non-transitory machine readable medium of claim 12, wherein the message comprises digital rights management data.

\* \* \* \* \*